United States Patent [19]

Dahl

[11] 4,338,054
[45] Jul. 6, 1982

[54] SOLID EXTERNALLY THREADED FASTENERS HAVING GREATLY INCREASED DUCTILITY

[76] Inventor: Norman C. Dahl, 40 Fern St., Lexington, Mass. 02173

[21] Appl. No.: 95,165

[22] Filed: Nov. 19, 1979

[51] Int. Cl.³ .............................................. F16B 35/00
[52] U.S. Cl. ..................................... 411/424; 29/407; 411/8; 411/389
[58] Field of Search ............... 411/424, 411, 378, 389, 411/388, 8–14, 392; 10/27 R, 10 R; 29/407

[56] References Cited

U.S. PATENT DOCUMENTS

| 440,331 | 11/1890 | Rogers | 411/424 |
| 461,621 | 10/1891 | Rogers | 411/424 |
| 1,203,505 | 10/1916 | Dodds | 411/424 |
| 1,926,925 | 9/1933 | Wescott | 411/389 X |
| 2,060,593 | 11/1936 | Schaurte et al. | 411/378 X |
| 2,168,000 | 8/1939 | Schaurte | 411/392 |
| 2,341,469 | 2/1944 | Newall | 10/27 R |
| 2,371,614 | 3/1945 | Graves | 74/579 E |
| 2,895,368 | 7/1959 | Place | 411/396 |
| 3,418,012 | 12/1968 | LaTorre | 411/411 |
| 4,018,132 | 4/1977 | Abe | 411/413 |
| 4,061,073 | 12/1977 | Easter et al. | 411/10 |
| 4,083,393 | 4/1978 | Okada | 411/267 |

FOREIGN PATENT DOCUMENTS

| 2658411 | 6/1978 | Fed. Rep. of Germany | 411/424 |
| 120088 | 8/1958 | U.S.S.R. | 411/392 |

Primary Examiner—Ramon S. Britts
Attorney, Agent, or Firm—Richard P. Crowley

[57] ABSTRACT

A metal fastener characterized by a sharp yield point and improved elongation beyond the yield point and a tensile strength (force) at least as large as the specified minimum for the grade, size, and threads of said metal fastener, which metal fastener has a nominal diameter D and comprises: one or more externally threaded components having threads of nominal diameter D with a stress area $A_s$; a nonthreaded shank component having a diameter $D_s$ equal to or substantially equal to the nominal diameter D extending axially with the threaded components; the shank component characterized by a reduced portion of axial length $L_r$, the reduced portion having an axially transverse cross-sectional area $A_r$ sufficiently less than the stress area $A_s$ of the threaded components along substantially the axial length $L_r$, whereby, on tightening of the metal fastener to failure the failure occurs in the reduced portion of the shank component; and means with the reduced portion, extending substantially the axial length $L_r$, to align the reduced portion of the metal fastener in a passageway in which the metal fastener is to be employed.

19 Claims, 14 Drawing Figures

SOLID EXTERNALLY THREADED FASTENERS HAVING GREATLY INCREASED DUCTILITY

BACKGROUND OF THE INVENTION

In recent years there have been major changes in the use of fasteners. One of these changes has been a shift to the use of high strength bolts and studs. Although these cost more per fastener than lower strength bolts or studs of the same size the overall cost of the completed joint is reduced. This lower cost results because fewer or smaller high strength fasteners are required and because design and manufacturing changes in the joint components become possible when fewer or smaller fasteners are used, leading to further cost savings.

Another significant change in fastener use has been the increasing acceptance by industry of the practice of tightening bolts into the plastic range, tightening them until they yield. This acceptance has been prompted by two advantages which accrue from tightening to yield. First, the tensions produced in the bolts are much more uniform than the tensions obtained when bolts are tightened within the elastic range because of the much greater influence that variation in the friction conditions has on the tension of bolts tightened within the elastic range. Second, tightening bolts into the plastic range utilizes the maximum possible strength of the bolt and thus allows the use of smaller bolts or fewer bolts of the same size.

There are three conditions which must be well controlled if tightening bolts to yield is to produce satisfactory results. First, the yield points of the bolts as manufactured must be kept within a specified range of tension variation. Second, the wrenching system must be capable of identifying accurately the yield point of each bolt so that the tightening can be halted when yield is reached. Third, care must be taken that no bolt is tightened into the plastic range so far that either the bolt breaks during tightening or the beginning of fracture is initiated at some point within the bolt with the result that the bolt breaks later when the equipment is in service.

Several wrenching systems have been developed for tightening bolts to yield. Angle control wrenching systems, also called turn-of-the-nut systems, operate by tightening the bolt through a specified angle which is large enough to bring the bolt into the plastic region but not so large there is danger that the bolt will break or that the beginning of fracture will be initiated.

Other wrenching systems make use of the fact that the torque required to tighten a bolt is proportional to the tension existing in the bolt and, therefore, the shape of the torque-rotation curve is proportional to the shape of the tension-rotation curve. Such wrenching systems incorporate transducers which measure torque and angle of tightening rotation, and a small on-board computer continuously monitors the outputs of these transducers and computes the torque-rotation gradient (slope). Tightening to yield is accomplished by programming the computer to stop tightening when the torque-rotation slope has dropped to some fraction (say, two-thirds) of the slope computed during the elastic tightening phase.

Angle control wrenching systems work relatively well with low strength bolts because these bolts have a relatively large ductility; that is, after beginning to yield plastically during tightening these bolts can be rotated through a relatively large angle before fracture occurs. This large ductility allows the low strength bolt to be tightened through a specified angle certainly large enough to bring the bolt tension beyond the beginning of plastic yield but not so large as to bring it to the point of maximum tension.

However, these angle control wrenching systems work less well with high strength bolts. These bolts have limited ductility and this means the specified angle through which the bolt is rotated cannot be large. Also, high strength bolts do not have a sharp yield point and this leads to uncertainty as to the minimum limit to be put on the specified angle of rotation, a situation complicated by the fact that the compression stiffnesses of the joint components must be taken into account.

Continuously monitoring torque-rotation gradient wrenching systems work relatively well with low strength bolts. The large ductility of these bolts allows the tightening to be stopped when the torque-rotation slope has dropped to a relatively small fraction (say, one-third) of the elastic tightening phase slope without danger that the point of maximum tension has been reached. Being able to program the wrench to stop tightening at a smaller fraction of the elastic tightening phase of the torque-rotation slope enhances the accuracy of the preload tensions obtained because of two factors. First, a point of lower slope in the torque-rotation curve also is a point of lower slope in the tension-rotation curve and thus variations in the rotation angle at which tightening is stopped leads to smaller variations in the preload tension. Second, a point at which the torque-rotation slope is a large fraction of the elastic tightening phase slope is harder to identify correctly because the stick-slip nature of friction behavior causes random variations in individual torque readings and these lead to variations in torque-rotation increments which might be interpreted mistakenly as changes in the slope itself, the effect of this being greater the smaller the difference between the elastic slope and the target slope. This difficulty is reduced by "smoothing" of the torque-rotation data, but slope measurement errors remain to cause variation in the preload tensions obtained.

The preload tensions produced in high strength bolts by continuously monitoring torque-rotation gradient wrenching systems are subject to greater variation because of the random data variations discussed above. Because these bolts have limited ductility and do not have a sharp yield point the target slope for stopping tightening must be a relatively large fraction of the elastic tightening phase slope. Additional fluctuations in the preload tensions result from variations in the hardness of manufactured bolts. The allowable hardness variation specified for high strength bolts means that the tensile strength, and thus the yield strength, can vary over a considerable range, by as much as 15 to 20%.

I previously have invented and patented a process for reducing the range of variation in preload tensions produced in high strength bolts tightened to yield by a continuously monitoring torque-rotation gradient wrenching system. This process, which is set forth in my U.S. Pat. Nos. 4,035,858 and 4,078,273, consists of adding to the manufacturing process a step which consists of work hardening each bolt by subjecting it to a tensile force of given magnitude. The bolts so treated all will have the same yield point level irrespective of their individual hardnesses and, further, when being tightened each bolt will have a discontinuity in the slope of its torque-rotation curve at the same level of preload tension. There will be a corresponding discontinuity in the slope of the torque-rotation curve which a continuously monitoring torque-rotation gradient wrenching system will be able to detect with accuracy.

One deficiency with my pre-use work hardening process of U.S. Pat. Nos. 4,035,858 and 4,078,273 is that it adds a relatively complicated step to the manufacturing process and thus increases the cost of the bolts. A second deficiency is that this process does not increase the ductility of high strength bolts. An increase in the bolt ductility would allow the use of a larger maximum angle limit for the specified angle employed by angle control wrenching systems and, also, permit a greater number of reuses of a bolt tightened to yield.

Because of these deficiencies I began to search for a more economical way to provide high strength fasteners with a definite yield point and, at the same time, increase their ductility substantially. As will be evident from the following description of my invention I have been successful in this search.

SUMMARY OF THE INVENTION

My invention relates to improved metal threaded fasteners such as threaded bolts, cap screws, or studs and to processes of tightening such fasteners. In particular, my invention concerns an externally threaded fastener incorporating a portion whose axially transverse cross sectional area is reduced below the stress area of the threads of the threaded part of the fastener, with this reduced portion being designed such that if the fastener is tightened until it fractures the failure will occur in the reduced portion rather than in the threaded part or in any other part of the fastener. My invention also discloses how this reduced portion can be further designed so that when tightened to yield the preload tension produced in the fastener is substantially the same as the preload tension produced in a regular fastener of conventional design having the same functional arrangement, nominal diameter, and overall length when the regular fastener is tightened to yield under the same tightening conditions.

Fasteners made according to my invention have unexpected behavior. Most important, bolts of my design—which I shall call Ductbolts for ease of reference—have plastic deformation characteristics quite different from those of regular bolts. One significant difference is that when the metal in the manufactured bolt has a sharp yield point the Ductbolt can be designed to have a sharp yield point, in contrast to the gradually increasing plastic deformation of a regular bolt made of the same metal. Another difference is that the Ductbolt has much more ductility than a regular bolt . . . of the magnitude, depending on the bolt metal and the particular design, of as much as two to three times the ductility of regular bolts. Moreover, despite its portion with reduced area the Ductbolt can be designed to produce preload tensions equal to the tension produced in a regular bolt tightened to yield.

The sharp yield point of the Ductbolt ensures that continuously monitoring torque-rotation gradient wrenching systems will have no difficulty in tightening Ductbolts precisely to the beginning of yielding. This means that the percentage variation in the preload tensions produced in Ductbolts will be the same as the percentage variation in the yield points of the Ductbolts as manufactured. Thus, Ductbolts will produce substantially more uniform preload tensions than will regular bolts.

The combination of sharp yield point and greatly increased ductility means that angle control wrenching systems will work well with high strength bolts. Further, the tension in the Ductbolt increases only slowly with tightening beyond the yield point and hence angle control systems will produce nearly as uniform preload tensions as will continuously monitoring systems. This can lead to significant savings in wrenching system investment since angle control systems can be much simpler and therefore less expensive than continuously monitoring torque-rotation gradient systems.

The greater ductility also allows the Ductbolt to be reused substantially more than the number of re-uses possible for regular bolts tightened to yield. Also, as will be described later, the Ductbolt can be designed so that it gives clear visual indication of when it no longer can be reused safely.

When equipment assembled with Ductbolts must be repaired in the field even relatively inexperienced mechanics using an ordinary hand wrench and the turn-of-the-nut method can tighten a Ductbolt to the same preload tension it carried when the equipment originally was assembled in the factory with a sophisticated wrenching system. This is possible because of the Ductbolt's combination of sharp yield point and large ductility.

The fact that Ductbolts can be tightened accurately to yield by inexperienced mechanics is a significant advantage. No manufacturer of equipment will go to the additional expense of purchasing sophisticated wrenching systems so bolts can be tightened to yield unless the satisfactory performance of the equipment requires that the bolts be tightened to yield. As a consequence, when the equipment must be repaired it will be mandatory that the bolts again be tightened to yield. Because regular bolts have no definite yield point and only limited ductility, only a very skilled mechanic or a sophisticated wrench can ensure that when the equipment is reassembled these bolts will be tightened to yield and yet not overtightened to the point where fracture has been initiated.

Where the volume of equipment repair is high, for example in the repair shop of a large automobile dealer, it will make economic sense to have a sophisticated wrench on hand. But in the majority of cases equipment is dispersed, its failure is intermittent and unpredictable, and repair must be done at the equipment site. In these situations the cost of sophisticated wrenches will preclude their being on hand, and if regular bolts have been used in original assembly and a skilled mechanic is not present the equipment reassembly will have to await the arrival of a sophisticated wrench. If Ductbolts have been used in original assembly there will be no delay or difficulty in reassembling equipment after repair, even in remote field sites.

The reduced portion of the Ductbolt can be created by cold forming methods such as are used to give shape to regular bolts. In most cases this will involve having a cold forming machine with one or two more stations than are used for making regular bolts. Since the production rate will be unchanged the incremental cost of forming the Ductbolt will be substantially only the amortized die and capital costs for the extra stations.

Counteracting this cost increment will be the cost reduction which will come as a consequence of the steel volume saved due to the reduced portion of the Ductbolt. Expressed as a percentage of the steel volume in a regular bolt, the steel saving can range from about 8 percent for a high strength bolt whose length is 4 times the nominal diameter to about 20 percent for a bolt 10 diameters in length. For low strength bolts the steel saving can be about twice these values.

The lighter weight of the Ductbolt will give it an additional competitive advantage for some applications, for example in aircraft and space vehicles, and perhaps in the automotive industry where every effort is being made to save weight in order to reduce gasoline consumption.

This behavior of the Ductbolt, which differs so radically from that of a regular bolt, is a direct consequence of the basic concept underlying my invention. The evolution of this concept began with my observation that many of the medium carbon alloy steels used to make high strength bolts have inherent material properties of sharp yield point and large ductility, ductility of the same order as that of the low carbon steels used to manufacture low strength bolts. This observation led me to ask: Why are these inherent material properties of these alloy steels not displayed in the behavior of regular high strength bolts? Investigation of this question informed me that, in fact, these material properties of sharp yield point and large ductility are displayed in the behavior of high strength bolts, but they are displayed in only a small volume of the bolt's metal and in such manner that their existence is not evident in the bolt's overall deformation behavior.

In a regular bolt or stud the metal adjacent to the root of the threads is the most highly stressed. The bolt is of minimum diameter here and the notched shape of the thread at its root produces stress concentration to further increase the stress level. When the bolt tension increases to the level where yielding begins in this region of highest stress the amount of metal which undergoes yielding initially is very small, at any point along the spiraling threads being limited to a localized volume around the thread root because the stresses near a notch decrease rapidly with distance from the notch. As a consequence, even though the metal around the thread begins to yield with a sharp yield point the total deformation of this metal will be very little because the volume of yielded metal is small. The spiral nature of the thread complicates the situation further by requiring deformation of the unyielded metal away from the thread root in order for the plastic deformation of the yielded metal to be translated into axial plastic elongation of the bolt. The result is that the overall axial deformation of a regular bolt in either a tensile test or in the process of being tightened is a smooth transition from elastic to plastic elongation even though the metal at the root of the thread begins to yield abruptly.

The limited overall ductility of a regular bolt, i.e. the limited overall axial elongation from the beginning of plastic yielding to the point of fracture, also results from the fact that the most highly stressed metal is adjacent to the thread. The notched shape of the thread induces a triaxial state of stress in this region and triaxial tension reduces the plastic strain that ductile metals can undergo before fracture is initiated. The deformation restraint imposed by the spiral nature of the thread geometry, discussed above, further reduces the overall axial plastic elongation. The combination of these two effects results in the limited overall axial ductility exhibited by regular bolts.

Out of this understanding of the interplay between the inherent plastic stress-strain behavior of the bolt metal and the overall axial deformation of a regular bolt there evolved the basic concept which underlies my invention. I reasoned that I could produce bolts with radically different overall axial elongation behavior by adopting the following design concept: the typical failure of bolts in their threaded portion should be preempted by designing the bolt such that failure during tightening always occurs in another portion of the bolt in a mode of failure which permits the inherent plastic yield and ductility properties of the bolt metal to be fully exhibited in the overall axial deformation of the bolt, and also making the design such that when the bolt is tightened to yield the preload tension will be substantially the same as the preload tension in a regular bolt tightened to yield. Through theory and experiment I have utilized this concept to arrive at specific designs which combine geometric shape, particular dimensions, and material properties to give the Ductbolt the unique behavior described above.

BRIEF DESCRIPTION OF THE DRAWINGS

FIG. 7 displays torque and tension data taken in a tightening twist of a ⅜ in.−16 grade 8 prior art regular bolt of core hardness Rockwell C 36.0 for which the length between the bolt head and the nut was 2.74 in.

DESCRIPTION OF THE PREFERRED EMBODIMENT

As described earlier, the basic concept of my invention is to design the Ductbolt such that the inherent plastic yield and ductility properties of the bolt metal are fully exhibited in the overall axial elongation of the bolt. A practical economic constraint on the design is that when the Ductbolt is tightened to yield the bolt tension must be substantially the same as the tension produced in a regular bolt tightened to yield.

In order for the inherent plastic yield and ductility properties of the bolt metal to be fully exhibited in the overall axial elongation of the bolt when it is being tightened it is necessary that an appreciable length of the bolt outside of the threaded region must be the most highly stressed region in the bolt and the form of the bolt over this length must be such that the stress gradients of the axial stress are small and there is little triaxiality of stress. These conditions will be produced by a design in which a nonthreaded portion of the bolt has an axially transverse cross section which varies only gradually in shape or area over the length of the portion and the area is less than the stress area of the threads, $A_s$.

The stress are of the threads is that area which when multiplied by the inherent tensile strength (stress) of the bolt metal gives the tensile strength (force) measured in a tensile test of the bolt. Since a thread is formed in a spiral the stress area does not lend itself to precise analytical definition and the definition has been made on an empirical basis. (See Society of Automotive Engineers Handbook, 1979, SAE Standard J429j, Mechanical and Material Requirements for Externally Threaded Fasteners, Table 5, page 5.05, and SAE Standard J1199, Mechanical and Material Requirements for Metric Externally Threaded Fasteners, Table 5, page 5.10.)

When the axially transverse cross section varies only gradually in shape or area over the length of this reduced portion the axial stress due to the tension will be substantially uniform throughout the portion and there will be no hinderance to the local axial strains in adding cumulatively to produce overall axial elongation of the bolt. In the reduced portion the torsional shear stress due to the tightening torque will vary with radial position; this shear stress will influence the amount of plastic deformation but will not disturb the distribution of axial stress or strain.

Figure 1B:
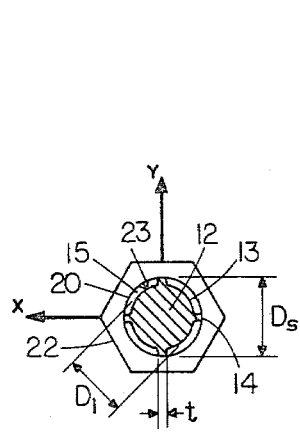
FIG. 1b depicts an axially transverse cross sectional view of the Ductbolt of FIG. 1a, the cross section being made in the reduced portion.
Figure 1A:
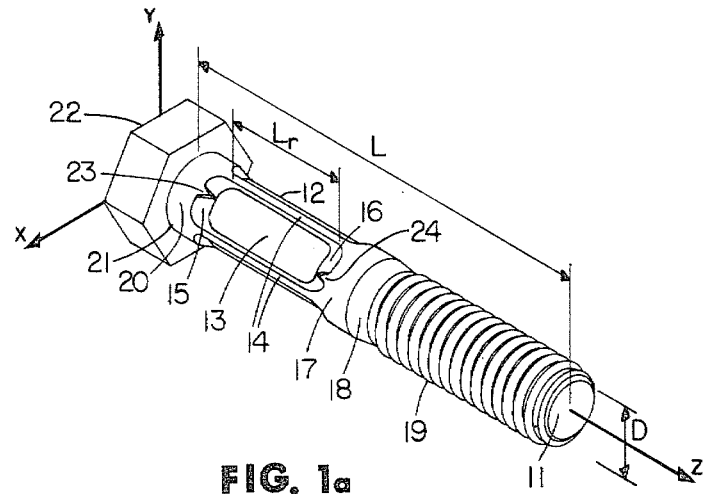
FIG. 1a is an isometric view of a Ductbolt incorporating the preferred embodiment of my invention in which the reduced portion of axial length $L_r$ incorporates axially aligned ribs which extend out to the shank diameter $D_s$ of the bolt.

A Ductbolt incorporating this kind of reduced portion is shown in FIG. 1a. The Ductbolt 11 of nominal diameter D is comprised, in axial sequence, of a head component 22, a shank component 20, a transition portion 15, a reduced portion 12, a transition portion 16, a shank component 17, a transition 18, and a threaded component 19. FIG. 1b shows a view of an axially transverse cross section through the reduced portion 12. The fillet 21 between the head component 22 and the shank component 20, as well as the head component 22, shank component 20, shank component 17, transition 18, and threaded component 19 are made as in prior art regular bolts.

As may be seen from FIGS. 1a and 1b, the reduced portion 12 is of constant cross sectional shape along its length $L_r$ and is comprised of a solid cylinder 13 of diameter $D_1$ from which four equally spaced, axially aligned ribs 14 protrude out to the diameter $D_s$ of the shank components 20 and 17. The transition portions 15 and 16 provide smooth transitions between the reduced portion 12 and, respectively, the shank components 20 and 17.

The area $A_r$ of the axially transverse cross section of the reduced portion 12 is made less than the stress area $A_s$ of the threaded component 19.

Figure 2:
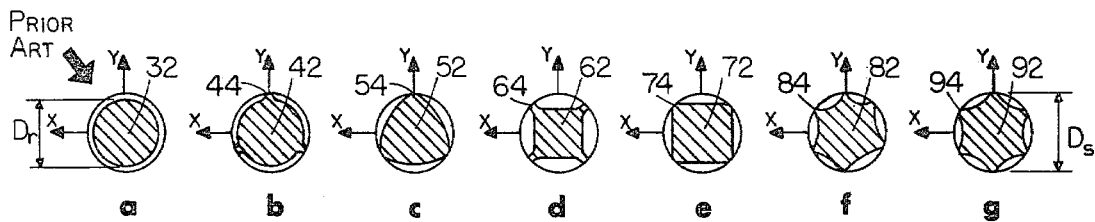
FIG. 2a depicts an axially transverse reduced cross section of circular shape which has been used to prior art waisted bolts and studs as a means for increasing the fastener's elastic elongation.
FIG. 2b through FIG. 2g depict various axially transvere cross sectional shapes which could be incorporated in the reduced portion of this invention; all shapes except that of FIG. 2f are symmetric about the axis of the fastener.

The axially aligned ribs 14 serve the purpose of aligning the parts of joints which may be clamped by the bolt 11. Functionally, these ribs could be made inclined to the axis, in spiral form. If the cross section of the reduced portion 12 did not extend out to the shank diameter $D_s$, e.g. if the cross section were as in FIG. 2a, the bolt would exert no centering force to align a thin joint part—e.g. a gasket—positioned axially at the reduced portion. The axially aligned ribs 14 ensure that in production line assembly it will not be necessary to waste time in aligning the parts in joints.

As noted earlier in the brief description of the drawings, the circular cross sectional shape of FIG. 2a has been used in prior art waisted bolts and studs as a means for increasing the fastener's elastic elongation; when such waisted fasteners are subjected to vibratory loads the increased elastic elongation serves to reduced the amplitude of alternating stress acting on the threads and thereby serves to increase the fatigue life of the fastener. Also, when bolts and studs cannot be tested in full size to determine tensile yield and strength properties the tests are conducted with waisted tensile specimens machined from the bolt or stud (see SAE Handbook, SAE Standard J429j, op.cit., Paragraph 5.7—Testing of Machined Test Specimens, page 5.04).

Figure 3:
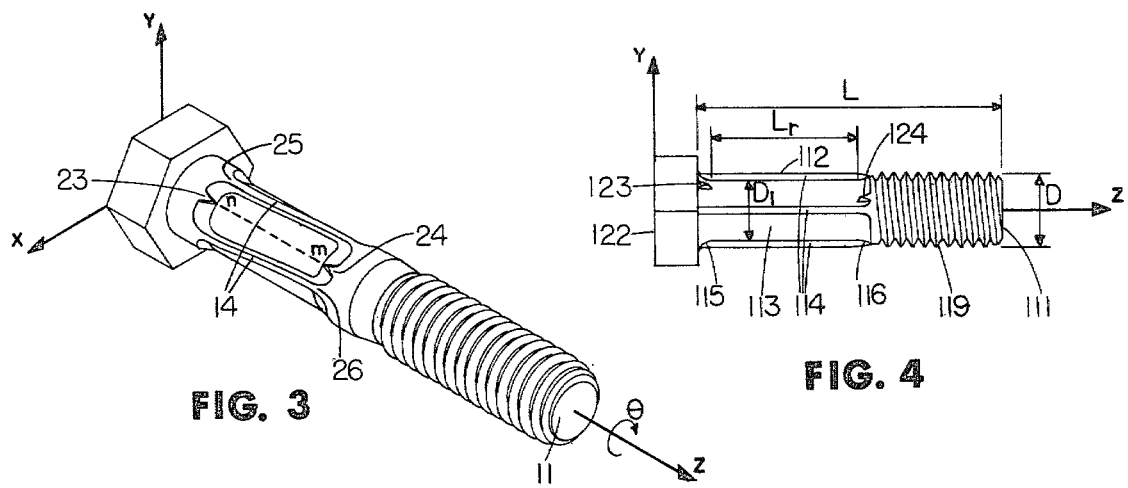
FIG. 3 depicts the Ductbolt of FIG. 1a after the reduced portion has undergone permanent twist through an angle $\theta$ as a result of plastic deformation during previous tightening.

The purpose served by the marks 23 and 24 in FIG. 1a will be made clear by reference to FIG. 3. The Ductbolt is designed so that the reduced portion 12 will undergo combined plastic axial elongation and plastic twisting while the bolt 11 is being tightened to yield. Each time the bolt is reused, i.e. again tightened to yield, there will be further plastic deformation of combined axial elongation and twist of the reduced portion 12. For any given design of Ductbolt the bolt manufacturer by experiment can determine the amount of plastic deformation the reduced portion 12 can undergo without danger that the portion will fail under service conditions. The manufacturer then will place the marks 23 and 24 on the production Ductbolt 11 in such relation to each other that when the reduced portion 12 has undergone this safe amount of plastic deformation the line nm between marks 23 and 24 in FIG. 3 will be parallel to the axis of the bolt. The user will continue to reuse the bolt until the sight line between the marks 23 and 24 is parallel to the bolt axis and at this point will discard the bolt.

FIGS. 2b through 2g illustrate other cross sectional shapes which could be used for the reduced portion. The choice of cross sectional shape will be influenced strongly by the relative costs of forming different shapes, a matter which will be discussed later.

Figure 4:
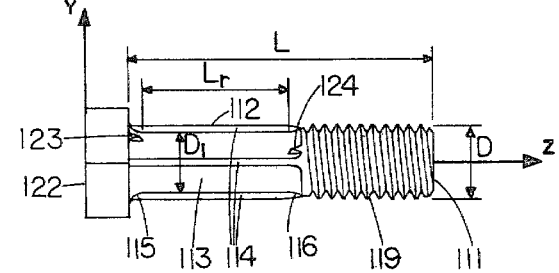
FIG. 4 illustrates a short Ductbolt in which there is no shank component between the reduced portion and the head component and no shank component between the reduced portion and the threaded component.

FIG. 4 illustrates the application of the concept of my invention in the design of a short bolt. In this design the shank components 20 and 17 of FIG. 1a have been eliminated. The transition portion 115 serves as a transition between the reduced portion 112 and the head component 122 and, as such, is shaped so that it also serves the function of the fillet 21 of FIG. 1a. The transition portion 116 serves as a transition between the reduced portion 112 and the threaded component 119. This transition will relieve the stress concentration associated with thread runout since experience has shown that a smoothly shaped groove placed at thread runout in a regular bolt improves the bolt's fatigue performance.

Another important advantage of the Ductbolt is that a short bolt will have essentially the same overall plastic elongation as a long bolt provided the cross sectional area $A_r$ and length $L_r$ of the reduced portions of the two bolts are the same. The practical significance of this is that short Ductbolts can be tightened to yield with the same ease and accuracy as long ones. In tightening regular bolts to yield it is more difficult to tighten short bolts satisfactorily.

Figure 5:
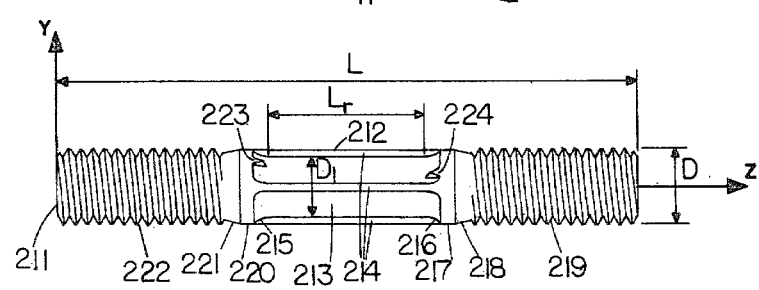
FIG. 5 shows a stud incorporating the preferred embodiment of my invention.

FIG. 5 shows a stud design incorporating the preferred embodiment of my invention. The stud 211 of nominal diameter D comprised, in axial sequence, of a threaded component 222, a transition 221, a shank component 220, a transition portion 215, a reduced portion 212, a transition portion 216, a shank component 217, a transition 218, and a threaded component 219. The threaded component 222, shank component 220, shank component 217, and threaded component 219 are made as in regular bolts. It is obvious that the shank components 220 and 217 could be eliminated and transitions made directly between the reduced portion and the threaded component, as illustrated in FIG. 4.

Figure 6:
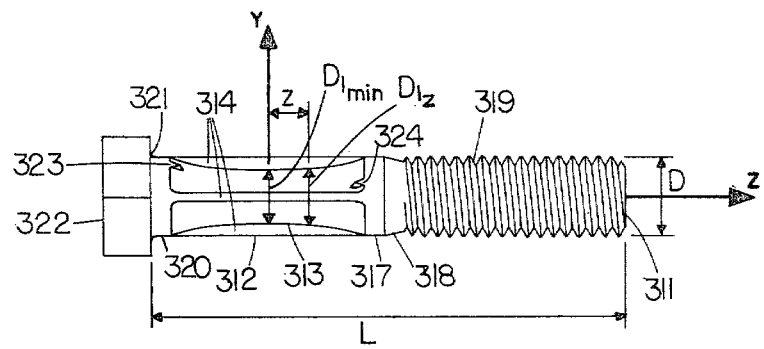
FIG. 6 shows a Ductbolt incorporating the preferred embodiment of my invention in which the axially transverse cross sectional area varies along the length of the reduced portion.

The desired functional behavior of the Ductbolt can be obtained with a design in which the cross sectional area $A_r$ of the reduced portion varies along the length of the portion. Such a design incorporating the cross sectional shape of the bolt 11 of FIG. 1 is illustrated in FIG. 6. The diameter $D_1$ of the cylindrical part 313 of the reduced portion 312 varies with distance z from the location of minimum diameter $D_{1min}$. The length $L_r$ of the reduced portion is the distance between the two locations at which the cross sectional area $A_r$ reaches the value $A_r = A_s$ where $A_s$ is the stress area of the threaded component 319. The axial portions extending between these two locations and the two shank components 320 and 317 will be transition portions.

Figure 7:
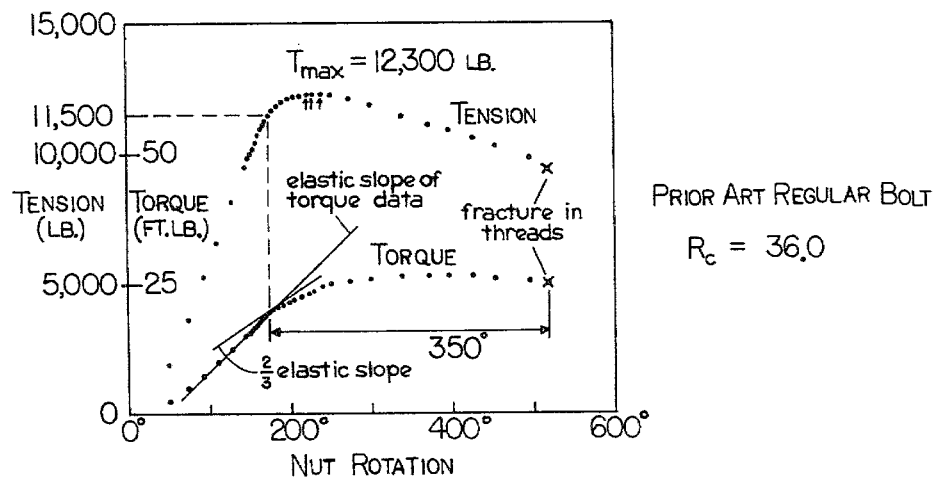

FIG. 7 displays torque and tension data taken in a tightening test of a ⅜ in.-16 grade 8 prior art regular bolt for which the length between the bolt head bearing surface and the nut was 2.74 in. The bolt head was held fixed and the nut was rotated with a hand torque wrench which measured the torque. The tension was measured by a Skidmore-Wilhelm tension tester which was clamped by the bolt.

Both the tension data plot and the torque data plot are non-linear at the start of tightening when the bolt is being brought to a 'snug' condition. Following this both plots become linear during the elastic tightening phase and then gradually become non-linear again as the bolt goes from elastic to plastic deformation under the combined effect of the tension and the torque acting on it. The tension plot reaches a maximum, indicated by the vertical arrows, and then drops off until the bolt fractures in the threaded component at just over 500°. The tightening torque continues to rise beyond the point of maximum tension and then drops somewhat before fracture occurs.

In FIG. 7 there is located the point where the slope of the torque-rotation data plot is two-thirds of the elastic slope of this data plot. Presumably this is the point where a continuously monitoring torque-rotation gradient wrenching system would stop tightening. The point is at a nut rotation angle of 175° and the preload tension in the bolt at this angle is 11,500 lb. (At the point where the slope of the tension-rotation data plot is two-thirds of the elastic slope of this data plot the preload tension is 11,200 lb.) The ductility of the bolt, the angle of nut rotation from the beginning of yielding to the point of fracture, is 350°.

Figure 8:
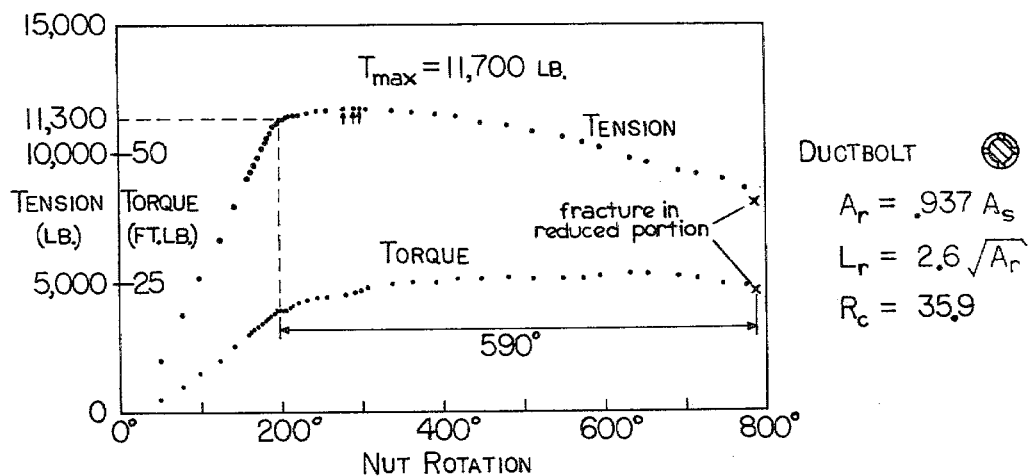
FIG. 8 displays data taken in a similar tightening test of a Ductbolt incorporating the preferred embodiment of my invention, in which the Ductbolt was machined from a grade 8 regular bolt of the same manufacture as used in the test reported in FIG. 7.

FIG. 8 displays torque and tension data taken in a similar tightening test of a Ductbolt incorporating the preferred embodiment shown in FIG. 1. This Ductbolt was machined from a ⅜ in.-16 grade 8 regular bolt of the same manufacture as used for the test reported in FIG. 7. The cross sectional area of the reduced portion was $A_r = 0.0726$ in.$^2 = 0.937 A_s$ where $A_s$ is the stress area of ⅜ in.—16 threads and has the value of 0.0775 in.$^2$ (see *SAE Handbook*, SAE Standard J429 j, Table 5, op.cit., page 5.05). The length of the reduced portion was $L_r = 0.70$ in. $= 2.6 \sqrt{A_r}$.

In the torque-rotation data plot of FIG. 8 there is a discontinuity in slope at the end of the elastic tightening phase: at a nut rotation angle of about 200° the torque abruptly becomes constant for about 10° of rotation and then begins to increase again. This slope discontinuity is a consequence of the fact that the reduced portion of the Ductbolt has a sharp yield point at this angle of nut rotation, as may be seen from the tension-rotation data plot. A continuously monitoring torque-rotation gradient wrenching system would have no difficulty in sensing this slope discontinuity accurately and would stop tightening at this point, leaving the bolt with a preload tension of 11,300 lb.

In this tightening test the tension begins to increase again after the yield point and reaches a maximum of 11,700 lb., indicated again by the vertical arrows, and then begins to drop off until the bolt fractures in the reduced portion at a nut rotation of just under 800°. The ductility of this Ductbolt is 590°, about 1.7 times the ductility of the regular bolt of FIG. 7.

Figure 9:
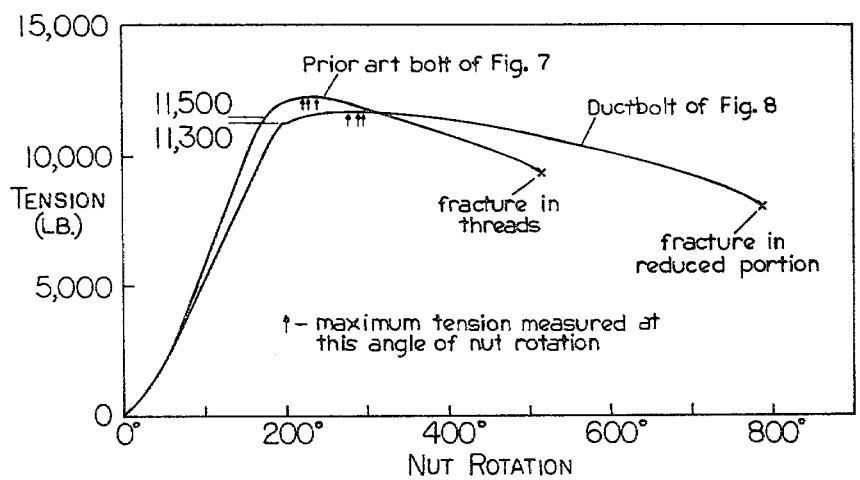
FIG. 9 shows curves representing the tension data plots displayed in FIGS. 7 and 8.

The curves in FIG. 9 were constructed from the tension-rotation data plots of FIGS. 7 and 8. From this superposition of tension-rotation behaviors the performance advantages of the Ductbolt over a regular bolt are apparent. Most obvious is the sharp yield point of the Ductbolt as contrasted with the gradual onset of plastic deformation in the regular bolt. Because Ductbolts have this sharp yield point the percentage variation in preload tensions in a group of Ductbolts tightened to yield by a continuously monitoring torque-rotation gradient wrenching system will be essentially equal to the percentage variation in the yield point levels in the group of Ductbolts as manufactured.

Another advantage of the Ductbolt is that the nut rotation from yield to the mean angle of the maximum tension data points is about 60° for the regular bolt while for the Ductbolt it is about 90°, an added factor of safety when tightening to yield with an angle control wrenching system. Also, the preload tensions produced in Ductbolts tightened to yield by an angle control wrenching system will not vary much as a consequence of the use of different specified angles (see discussion on pages 3 and 4 above) because the tension in the Ductbolt increases only slowly as the bolt is tightened beyond its yield point.

From the ratio of the angles from yield to maximum tension for the two bolts of FIG. 9 and from the different shape of the two tension curves after the point of maximum tension it is clear than another advantage of the Ductbolt is that it can be reused many more times than a regular bolt. This advantage is enhanced by the safeguard provided by the marks on the Ductbolt which tell the user when the reuse life has been exhausted and the bolt should be discarded.

Figure 10:
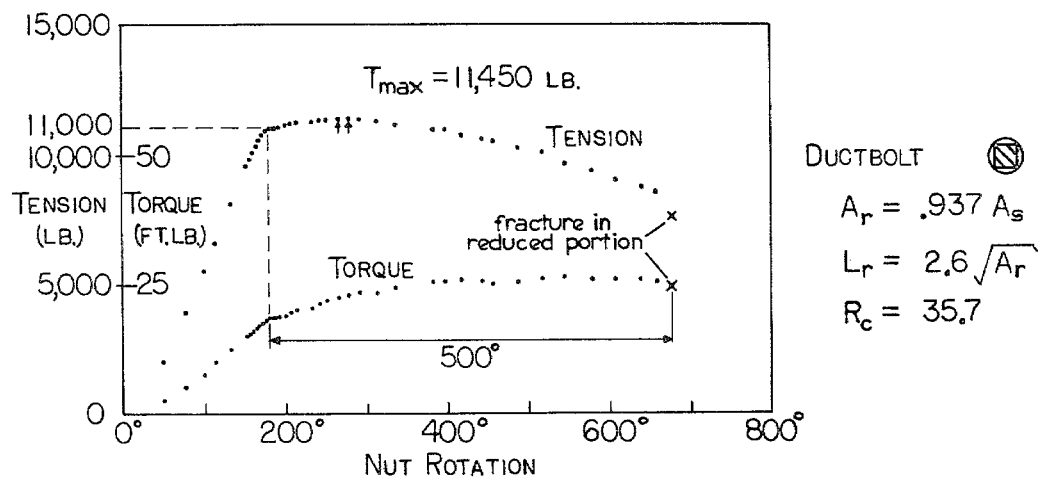
FIG. 10 displays torque and tension data taken in a similar tightening test of a Ductbolt with a square axially transverse cross sectional shape machined from a grade 8 regular bolt of the same manufacture as used for the test reported in FIG. 7; the values of the axial length $L_r$ and the axially transverse cross sectional area $A_r$ of the reduced portion are the same as for the Ductbolt of FIG. 8.

FIG. 10 reports data on a tightening test of a Ductbolt for which the reduced portion has the same cross sectional area $A_r$ and length $L_r$ as the Ductbolt of FIG. 8 but the cross sectional shape is square. From a comparison of FIGS. 8 and 10 it may be seen that the qualitative and quantitative behavior of these bolts is essentially the same, except that the ductility is somewhat less for the Ductbolt with the square cross sectional shape.

From these results it may be concluded that differences in cross sectional shape will produce marginal differences in bolt performance and that, therefore, the ease of manufacture should be the primary determinant of cross sectional shape. The preferred embodiment cross sectional shape of FIG. 1b has been selected on the basis that this reduced portion could be formed either by cold extrusion parallel to the axis of the fastener or by cold swaging perpendicular to the fastener axis, whichever proves to be cheaper. It is possible that some other of the shapes in FIG. 2, or some other shape not depicted there, will prove to be cheaper to form than the shape of FIG. 1b.

Figure 11:
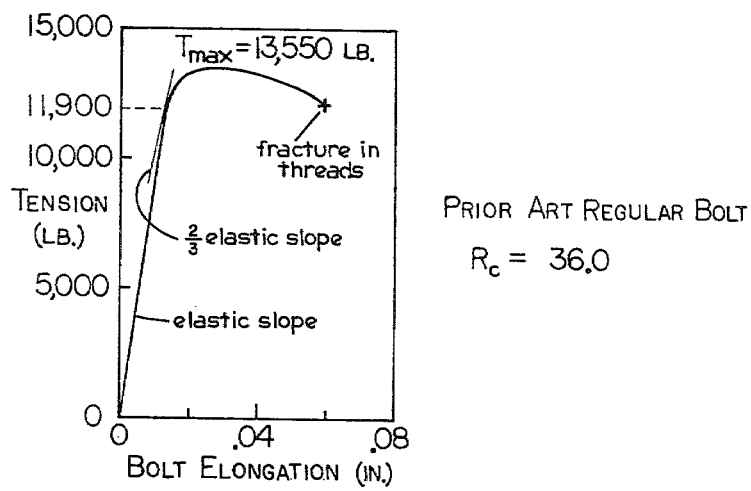
FIGS. 11 and 12 display the data taken in continuous recording tensile tests for bolts similar to those whose tightening behavior is displayed, respectively, in FIGS. 7 and 8.
Figure 12:
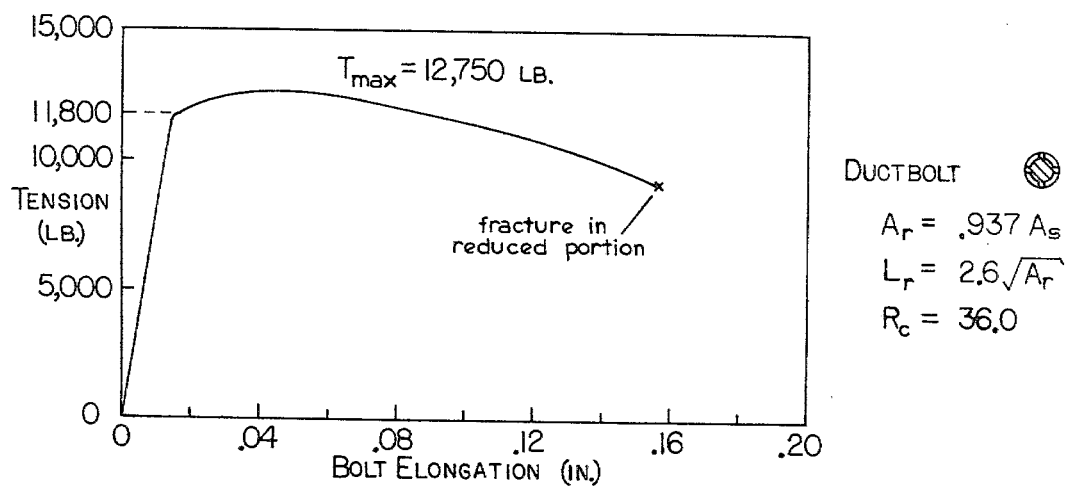

FIGS. 11 and 12 present the data taken in continuous recording tensile tests of a prior art regular bolt and a Ductbolt of the same dimensions as the bolt whose tightening behavior is shown in FIG. 8. The shapes of these tensile test curves are similar to the shapes of the corresponding tension-rotation data plots. However, the tensile test curve for the prior art regular bolt drops off relatively much more rapidly than does the tightening tension-rotation data plot of FIG. 7. This behavior is reflected in the fact that the tensile ductility (plastic elongation from the beginning of yielding to the point of fracture) of the Ductbolt of FIG. 12 is 3.0 times the ductility of the regular bolt of FIG. 11, whereas for the tightening tests of FIG. 8 and FIG. 7 the ratio of ductilities was 1.7. The fact that the regular bolt has relatively better ductility in tightening than in tension loading probably is associated with the spiral geometry of the threads: this spiral geometry would have little influence on the notch stress concentration for axial tensile stress but most likely would reduce the stress concentration for torsional shear stress below that for a similar notch in the form of a circumferential groove around the bolt.

The proof load and tensile strength requirements for $\frac{3}{8}$ in.-16 grade 8 bolts (see *SAE Handbook*, SAE Standard J429j, op. cit., Table 5, page 5.05) are that the proof load be 9,300 lb. and the tensile strength be 11,600 lb. The proof load is the tension the bolt must withstand without permanent set (plastic deformation). The Ductbolt of FIG. 12 exceeds these requirements.

In order for the Ductbolt to perform its function of pre-empting failure in the threaded component, the axially transverse cross sectional area $A_r$ of the reduced portion must be sufficiently smaller than the stress area $A_s$ of the threads in the threaded component to ensure that failure occurs in the reduced portion. Tightening tests with Ductbolts (machined from high strength prior art regular bolts which were heat treated after forming) with uniform cross sectional area $A_r$ along the length $L_r$ of the reduced portion gave fracture in the reduced portion when the cross sectional area was $0.97A_s$ and fracture in the threaded component when the cross sectional area was greater than $0.97A_s$. From these experiments it can be concluded that in a Ductbolt design where the cross sectional area varies along the length of the reduced portion, as illustrated in FIG. 6, the minimum cross sectional area $A_{rmin}$ has an upper limit of about $0.97A_s$.

The tensile strength requirements for fasteners combine with the hardness requirements to impose a lower limit on the minimum cross sectional area $A_{rmin}$. Every fastener of a given grade, size, and thread has to meet specified requirements with respect to minimum tensile strength (stress), minimum tensile strength (force), and minimum and maximum core hardness: see *SAE Handbook*, SAE Standard J429j, op.cit., Table 1, page 5.01, and Table 5, page 5.05, and SAE Standard J1199, op.cit., Table 1, page 5.07, and Table 5, page 5.10. It can be verified from these tables that for a given fastener the specified minimum tensile strength (stress) $\sigma_{tsmin}$ multiplied by the stress area $A_s$ yields the specified minimum tensile strength (force). Also, there is close correlation between hardness and tensile strength, and by reference to *SAE Handbook*, SAE Information Report SAE J417b, Hardness Tests and Hardness Number Conversions, Table 4, pages 4.06–4.07, it can be verified that the specified minimum tensile strength (stress) $\sigma_{tsmin}$ is the tensile strength (stress) corresponding to the specified minimum core hardness. Similarly, one can determine a maximum tensile strength (stress) $\sigma_{tsmax}$ corresponding to the specified maximum allowable core hardness, where $\sigma_{tsmax}$ is the maximum tensile strength (stress) one can anticipate having in a fastener of a given grade and size.

Since $A_{rmin}$ will be less than the stress area $A_s$, the tensile strength (stress) $\sigma_{ts}$ of the metal in the reduced portion of a Ductbolt will have to be higher than the tensile strength (stress) of a prior art regular bolt if both are to have the same tensile strength (force). In particular, if the Ductbolt is to have a tensile strength (force) equal to the specified minimum tensile strength (force) then the following equality must hold:

$$\sigma_{ts} A_{rmin} = \sigma_{tsmin} A_s \qquad (A)$$

The larger $\sigma_{ts}$ is made the smaller $A_{rmin}$ can be made. However, the specified maximum on the core hardness imposes a maximum value of $\sigma_{tsmax}$ on the tensile strength (stress) $\sigma_{ts}$ and thus, in order that the Ductbolt have the specified minimum tensile strength (force), the minimum cross sectional area $A_{rmin}$ has a lower limit of $$A_{rmin} = (\sigma_{tsmin}/\sigma_{tsmax}) A_s \qquad (B)$$

The step from Equation (A) to Equation (B) has inherent in it the assumption that the hardness of the reduced portion will be the same as the hardness of the threaded component. The core hardness of a fastener is measured in the threaded component—see *SAE Handbook*, SAE Standard J429j, op.cit., Paragraph 5.1, page 5.02, and SAE Standard J1216, Test Methods for Metric Threaded Fasteners, Paragraph 3.1, page 5.11. When a Ductbolt is heat treated after forming the hardness in the reduced portion will be substantially the same as the hardness in the threaded component and thus Equation (B) will be valid. As a consequence, for a Ductbolt of a given grade and size which is heat treated after forming the minimum axially transverse cross sectional area $A_{rmin}$ of the reduced portion can range about from $$0.97 A_s \text{ to } (\sigma_{tsmin}/\sigma_{tsmax}) A_s \qquad \text{(C)}$$

provided that for any specific $A_{rmin}$ the tensile strength (stress) $\sigma_{ts}$ of the metal in the reduced portion is at least such as to satisfy Equation (A).

When a Ductbolt is not heat treated after forming the hardness of the metal in the reduced portion will be higher than the hardness in the threaded component because of the greater work hardening of the metal in the reduced portion. Core hardness readings taken in all components of prior art regular bolts not heat treated after forming indicate that the greater work hardening of the reduced portion can result in the tensile strength (stress) of the metal in the reduced portion being as much as 20 percent higher than the tensile strength (stress) of the metal in the threaded component. For any particular Ductbolt the exact amount by which the tensile strength (stress) of the metal in the reduced portion will exceed the tensile strength (stress) of the metal in the threaded component will depend on the work hardening properties of the bolt metal and on the particular sequence of cold forming operations used to shape the Ductbolt. Taking 20 percent as a reasonable estimate of this work hardening effect, then for a Ductbolt of a given grade and size which is not heat treated after forming the minimum axially transverse cross sectional area $A_{rmin}$ will have a lower limit of about $$A_{rmin} = \frac{\tau t s_{min}}{1.20 \, \tau t s_{max}} A_s = 0.83 \frac{\tau t s_{min}}{\tau t s_{max}} A_s \qquad \text{(D)}$$

As a consequence, for a Ductbolt of a given grade and size which is not heat treated after forming the minimum axially transverse cross sectional area $A_{rmin}$ of the reduced portion can range about from $$0.97 A_s \text{ to } 0.83(\sigma_{tsmin}/\sigma_{tsmax}) A_s \qquad \text{(E)}$$

provided that for any specific $A_{rmin}$ the tensile strength (stress) $\sigma_{ts}$ of the metal in the reduced portion is at least such as to satisfy Equation (A).

If a Ductbolt is going to fail in the reduced portion then in addition to making $A_{rmin}$ within a certain range it is necessary to make the axial length $L_r$ of the reduced portion of at least a certain length. Tests with various cross sectional areas $A_{rmin}$ and lengths $L_r$ established that $L_r$ must be at least about $\sqrt{A_{rmin}}$ in order to assure failure in the reduced portion.

Experiments also demonstrated that $L_r$ must be of at least a certain length in order for the inherent plastic yield and ductility properties of the bolt metal to be fully exhibited. For example, a grade 8 Ductbolt made of the same steel as the Ductbolt of FIG. 12 but with a length of only 1.5 $\sqrt{A_{rmin}}$ had an initial yielding behavior which was much less sharply defined than that exhibited in FIG. 12. However, the length $L_r$ required to exhibit the inherent yielding behavior of the bolt metal also depends on the properties of the particular metal; a similar Ductbolt of length 1.5 $\sqrt{A_{rmin}}$ but made of a different steel exhibited both sharp upper and lower yield points.

A short Ductbolt and a long Ductbolt having the same cross sectional area $A_{rmin}$ and length $L_r$ of reduced portion will have essentially the same plastic behaviors in tightening. As a consequence, short Ductbolts can be tightened accurately to yield as easily as long Ductbolts, in contrast to prior art regular bolts for which it is more difficult to tighten short bolts to yield.

As demonstrated by the yield point levels in FIG. 9, by proper combination of $A_{rmin}$ and the yield behavior off the metal in the reduced portion it is possible to design Ductbolts so that when tightened to yield they have substantially the same preload tension as regular bolts tightened to yield under the same conditions. Moreover, because of the sharp yield point of the Ductbolt the variation in Ductbolt preload tensions will be less than the variation in preload tensions of regular bolts.

From FIGS. 9, 11 and 12 it may be seen that the ratio of yield strength (force) to tensile strength (force) for a Ductbolt is higher than that for a prior art regular bolt when the inherent plastic yield behavior of the bolt steel is the same for both bolts. For applications where it is desired that the ratio of yield strength (force) to tensile strength (force) be about that for a prior art regular bolt, such a ratio can be obtained by altering the inherent plastic yield behavior of the Ductbolt steel through choice of steel composition and heat treatment (see *SAE Handbook*, op.cit., SAE Information Report J413a, Mechanical Properties of Heat Treated Steels, FIG. 2, page 3.13).

One such application where lower ratio of yield strength to tensile strength (i.e., greater work hardening) might be desired for a Ductbolt would be a situation where the joint, after assembly, will be subjected to repeated application and removal of external loads ranging up to 50 percent of the total of the preload tensions produced in the joint's bolts during tightening. A flange joint in a pipeline would be one example of such a situation.

Tests were made to compare the behavior of a Ductbolt and a prior art regular bolt under these loading conditions. Both bolts were ⅜ in.-16 grade 8, with the Ductbolt being machined from a prior art regular bolt of the same hardness. Each bolt was tested separately in a joint which had provision for measuring the tension in the bolt. The bolt was tightened just beyond yield (to 11,400 lb. for the Ductbolt and to 11,100 lb. for the regular bolt) and then external loads of increasing magnitude were applied to and removed from the joint, with the loss of bolt tension being measured after each load removal. Hardened steel washers were used under both the bolt head and the nut to remove the possibility of effects of embedment in the abutting joint surfaces.

After removal of an external load equal to 50 percent of the initial preload tension the Ductbolt showed a tension loss of about 5 percent of its initial preload tension and the regular bolt showed a loss of about 2½ percent. The difference between these losses is not of great practical importance in view of the fact that well designed joints tightened in the elastic range often suffer preload tension losses of 5 to 10 percent shortly after tightening as the cumulative result of relaxation of the joint members, bolt-nut threads, and any gasket. Further, subsequent applications of the external load will not cause additional loss of preload in the Ductbolt so long as the external load on the joint does not exceed 50 percent of the initial preload tension.

As indicated earlier, significant savings in steel volume are achieved by use of the Ductbolt design. The amount of steel that can be saved depends on the length of reduced portion that can be accomodated. As an example, consider a ⅜ in.-16 grade 8 Ductbolt of overall length L=2 in. If the threaded component is 1 in. long, which is enough to accomodate the specified minimum thread length (see *SAE Handbook*, op.cit., SAE Standard J105, page 15.01), then it will be possible to incorporate the reduced portion of the Ductbolt of FIG. 9, for which $L_r=0.70$ in. and $A_r=0.0726$ in.$^2$. Assuming that the shank diameter of a prior art regular bolt is $D_s=0.372$ in., calculation leads to the result that this Ductbolt will use about 10 percent less steel than a prior art regular bolt of the same length. A similar calculation for a Ductbolt of overall length L=4 in. having a reduced portion for which $L_r=2.70$ in. and $A_r=0.0726$ in.$^2$ leads to a saving of about 20 percent of the steel used to cold form a prior art regular bolt of 4 in. overall length.

For low strength bolts which are not heat treated after forming the work hardening of the reduced portion during cold forming leads to even greater possible savings in steel volume. If it is assumed that a ⅜ in.-16 grade 1 Ductbolt is manufactured such that the core hardness in the threaded component is the maximum permissible value of $R_b=100$, then from Equation (D) it may be calculated that the cross sectional area of the reduced portion may be as small as $A_r=0.0330$ in.$^2$. For a Ductbolt of overall length L=2 in. for which $A_r=0.0330$ in.$^2$ and $L_r=0.70$ in. the steel saving calculates to be about 21 percent, while for a Ductbolt of overall length L=4 in. with the same $A_r$ and with $L_r=2.7$ in. the calculation leads to a saving of about 43 percent. While the difficulty in maintaining very close control on the maximum core hardness will make it impractical to achieve these very high savings in steel volume, it should be possible to achieve savings of about 15 and 30 percent with, respectively, 2 in. and 4 in. ⅜ in.-16 grade 1 Ductbolts. Although the beginning of yield for low strength Ductbolts is not appreciably better defined than that for low strength prior art regular bolts the ductility is about twice as large, and this increased ductility combined with the substantial savings in steel volume gives the Ductbolt design distinct commercial advantages over low strength regular bolts.

Figure 13:
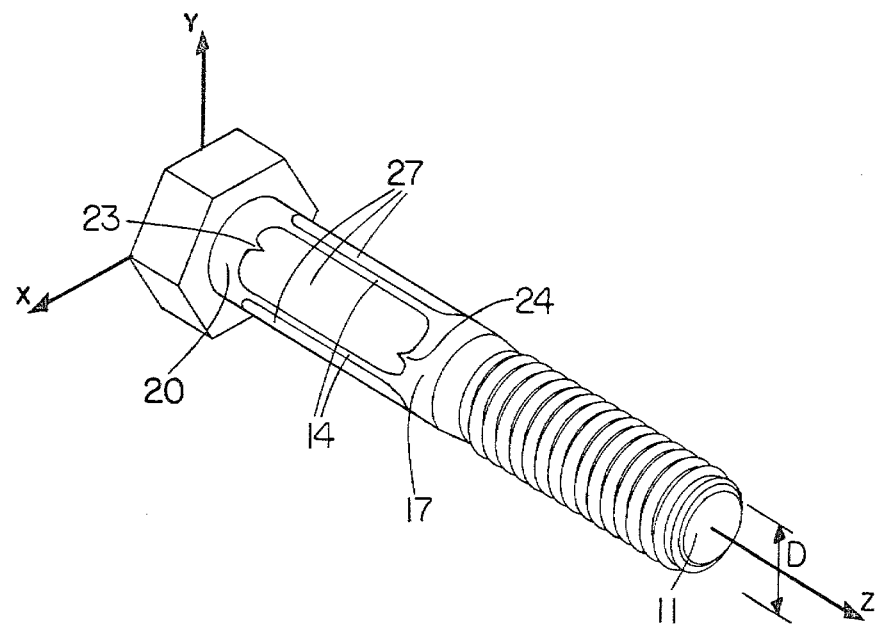
FIG. 13 is an isometric view of a Ductbolt comprised of a bolt similar to that depicted in FIG. 1 whereon the spaces between the axially aligned ribs have been filled with material out to the shank diameter $D_s$.

As noted earlier, the axially aligned ribs 14 of the Ductbolt in FIG. 1a serve the purpose of aligning the parts of joints being clamped by the bolt. This aligning function will be enhanced if the spaces between the ribs and extending out to the circular diameter $D_s$ of the shank components 17 and 20 are filled with a solid material in such manner that the solid material will not influence the deformation behavior of the Ductbolt yet will exert centering forces to align the joint parts. Such a Ductbolt is depicted in FIG. 13 where 27 indicates the solid material filling the spaces out to the diameter $D_s$.

The solid material will play no structural role and thus need only be stiff enough and strong enough to exert the required compressive centering forces and to survive handling and shipping prior to Ductbolt use. These requirements suggest molding plastic material into all the spaces in a single operation or molding plastic parts parts separately and then inserting them into the spaces.

Figure 14:
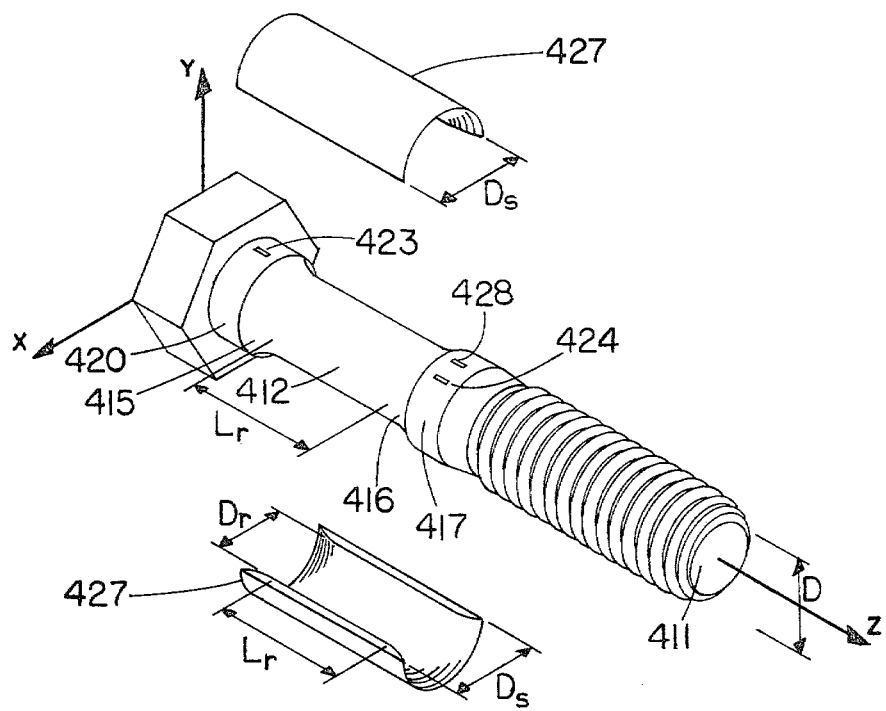
FIG. 14 is an exploded isometric view of a Ductbolt comprised of a bolt with reduced portion having a cross section of circular shape whereon the space surrounding the reduced portion has been filled with material out to the shank diameter $D_s$.

This concept of surrounding the reduced portion with solid material out of the shank diameter makes it practical to employ the circular cross section of FIG. 2a in a Ductbolt. An exploded isometric view of such a Ductbolt is shown in FIG. 14. The Ductbolt 411 has a reduced portion 412 of circular cross section with diameter $D_r$ and the reduced portion 412 is connected to the shank components 417 and 420 of diameter $D_s$ by means of the transitions 416 and 415, respectively. Surrounding the reduced portion and the transitions and extending out to the diameter $D_s$ is solid material 427 which, for purposes of illustration, is shown exploded in two semicircular shell parts. Ease of manufacture combined with the functional requirements of the solid material suggest molding plastic material around the reduced portion and transitions in one operation or molding plastic parts separately and assembling them around the bolt.

It is not necessary that the solid material fill all of the space out to the diameter $D_s$ but only that the surface of the material on the cylinder of diameter $D_s$ be functionally a cylindrical surface from the standpoint of exerting centering forces on the joint parts. For example, if the solid material were honeycombed in the radial direction with honeycomb cells of dimension small compared to $D_s$ the material surface would be functionally cylindrical.

FIG. 14 also illustrates another way of arranging marks on the surface of a Ductbolt to indicate the amount of plastic twist the reduced portion has undergone as a result of being tightened to yield. The marks 423 and 428 are aligned parallel to the axis of the bolt. The mark 424 is angularly positioned relative to mark 428 such that when the sight line between marks 423 and 424 is parallel to the bolt axis the reduced portion has undergone its safe permanent twist and the bolt should be discarded. After the bolt has been tightened a number of times the fraction of safe life remaining can be estimated by laying a straightedge through mark 423 and parallel to the bolt axis and scribing the position of the straightedge on the shank surface between marks 428 and 424. The position of the scribe mark relative to the marks 428 and 424 will indicate the fraction of safe life remaining.

The Ductbolt also can be tightened to produce specified preload tensions in the elastic range which are more accurate and more uniform than those obtained with prior art regular bolts. The tightening process will consist of first tightening the Ductbolt into the plastic range and then untightening it into the elastic range.

When tightening with a continuously monitoring torque-rotation gradient wrenching system the Ductbolt will be tightened to its sharp yield point. Then, using the threads as micrometer threads, the bolt (or nut) will be rotated in the untightening direction through a specified angle which brings the preload tension down to the specified level in the elastic range. The specified angle will be a function of the combined effective elasticities of the Ductbolt and nut and of the joint parts being clamped by the bolt.

When tightening with an angle control wrenching system the Ductbolt first will be tightened to some plastic condition beyond the yield point and then rotated in the untightening direction through a specified angle which brings the preload tension down to the specified level in the elastic range.

In selecting the metal from which to manufacture the Ductbolt, the forming processes to be employed, and the heat treatment, if any, to be used care must be exercised that the tensile strength (stress) of the metal in the reduced portion of the shank component of the completely manufactured Ductbolt is made such that if the Ductbolt is tested to failure in a tensile test the Ductbolt will fail in the reduced portion with a tensile strength (force) at least as large as the specified minimum for the grade, size, and threads of the Ductbolt.

Although socket head cap screws and many other shapes of externally threaded fasteners have not been discussed it is obvious that the principles of my invention can be incorporated in all externally threaded fasteners to produce designs which have the properties of sharp yield point and greatly increased ductility. Also, it is clear that my invention is equally applicable to externally threaded fasteners made of metals other than steel, for example titanium, aluminum, and stainless steel.

Having described my invention, what I now claim is:

1. A metal fastener characterized by a sharp yield point and improved elongation beyond the yield point and a tensile strength (force) at least as large as the specified minimum for the grade, size, and threads of said metal fastener, which metal fastener is a bolt of nominal diameter D and is heat treated after forming and comprises:
   (a) a head component for the application of torque to the fastener;
   (b) an externally threaded component having threads of nominal diameter D with a stress area $A_s$;
   (c) a nonthreaded shank component having a diameter $D_s$ equal to or substantially equal to the nominal diameter D axially extending between the head and threaded components and integrally therewith, the shank component characterized by a reduced portion of axial length $L_r$ with a first transition portion at the one end and a second transition portion at the other end of the reduced portion, and wherein within the reduced portion the maximum axially transverse cross-sectional area $A_{rmax}$ is not larger than the stress area $A_s$ of the threaded component and the minimum cross-sectional area $A_{rmin}$ ranges from about $0.97A_s$ to $(\sigma ts_{min}/\sigma ts_{max})A_s$, where, for the given grade and size of fastener, $\sigma ts_{min}$ is the specified minimum allowable tensile strength (stress) and $\sigma ts_{max}$ is the tensile strength (stress) corresponding to the specified maximum allowable core hardness, and the axial length $L_r$ ranges from about $\sqrt{A_{rmin}}$ to the maximum length that can be accommodated within the shank component and wherein the axially transverse cross-sectional area $A_r$ is noncircular in shape over substantially the axial length $L_r$; and
   (d) means with the reduced portion, extending axially along substantially the axial length $L_r$ of the reduced portion and the axial lengths of the first and second transition portions, to align the reduced portion of the metal fastener in a passageway in which the metal fastener is to be used and wherein said means to align the fastener includes a plurality of metal, generally parallel, raised, rib means extending generally axially and extending outwardly to the shank diameter $D_s$ of the fastener.

2. The metal fastener of claim 1 wherein the fastener includes marking means to indicate the amount of plastic twist deformation of the reduced portion on rotation tightening of the fastener.

3. The metal fastener of claim 1 wherein the tensile strength (stress) of the metal in the reduced portion is made of such value that if the metal fastener is tested to failure in a tensile test the fastener will fail in the reduced portion with a tensile strength (force) at least as large as the specified minimum tensile strength (force) for the grade, size, and threads of the fastener.

4. The metal fastener of claim 1 wherein the axially transverse cross-sectional area $A_r$ of the reduced portion is constant in size along the axial length $L_r$.

5. A metal fastener characterized by a sharp yield point and improved elongation beyond the yield point and a tensile strength (force) at least as large as the specified minimum for the grade, size, and threads of said metal fastener, which metal fastener is a bolt of nominal diameter D and is not heat treated after forming and comprises:
   (a) a head component for the application of torque to the fastener;
   (b) an externally threaded component having threads of nominal diameter D with a stress area $A_s$;
   (c) a nonthreaded shank component having a diameter $D_s$ equal to or substantially equal to the nominal diameter D axially extending between the head and threaded components and integrally therewith, the shank component characterized by a reduced portion of axial length $L_4$ with a first transition portion at the one end and a second transition portion at the other end of the reduced portion, and wherein within the reduced portion the maximum axially transverse cross sectional area $A_{rmax}$ is not larger than the stress area $A_s$ of the threaded component and the minimum cross-sectional area $A_{rmin}$ ranges from about $0.97A_s$ to $0.83(\sigma ts_{min}/\sigma ts_{max})A_s$, where, for the given grade and size of fastener, $\sigma ts_{min}$ is the specified minimum allowable tensile strength (stress) and $\sigma ts_{max}$ is the tensile strength (stress) corresponding to the specified maximum allowable core hardness, and the axial length $L_r$ ranges from about $\sqrt{A_{rmin}}$ to the maximum length that can be accommodated within the shank component; and
   (d) means with the reduced portion, extending axially along substantially the axial length $L_r$ of the reduced portion and the axial length of the first and second transition portions, to align the reduced portion of the metal fastener in a passageway in which the metal fastener is to be used.

6. The metal fastener of claim 5 wherein the fastener includes marking means to indicate the amount of plastic twist deformation of the reduced portion on rotational tightening of the fastener.

7. The metal fastener of claim 5 wherein the axially transverse cross-sectional area $A_r$ is noncircular in shape over substantially the axial length $L_r$ and the means to align the fastener includes a plurality of metal, generally parallel, raised, rib means extending generally axially and extending outwardly to the shank diameter $D_s$ of the fastener.

8. The metal fastener of claim 5 wherein the axially transverse cross sectional area $A_r$ is circular in shape and the means to align the fastener includes a solid material peripherally positioned around the reduced portion and the first and second transition portions and forming a generally cylindrical shape which extends from the surface of the reduced portion and the transition portions outwardly to the shank diameter $D_s$ of the fastener.

9. The metal fastener of claim 5 wherein the tensile strength (stress) of the metal in the reduced portion is made of such value that if the metal fastener is tested to failure in a tensile test the fastener will fail in the reduced portion with a tensile strength (force) at least as large as the specified minimum tensile strength (force) for the grade, size, and threads of the fastener.

10. The metal fastener of claim 5 wherein the axially transverse cross-sectional area $A_r$ of the reduced portion is constant in size along the axial length $L_r$.

11. A metal fastener characterized by a sharp yield point and improved elongation beyond the yield point and a tensile strength (force) at least as large as the specified minimum for the grade, size, and threads of said metal fastener, which metal fastener is a stud of nominal diameter D and comprises:
   (a) two externally threaded components having threads of nominal diameter D with stress area $A_s$;
   (b) a nonthreaded shank component having a diameter $D_s$ equal to or substantially equal to the nominal diameter D axially extending between the two threaded components and integrally therewith, the shank component characterized by a reduced portion of axial length $L_r$ with a first transition portion at the one end and a second transition portion at the other end of the reduced portion, and wherein within the reduced portion the maximum axially transverse cross-sectional area $A_{rmax}$ is not larger than the stress area $A_s$ of the threaded components and the minimum cross-sectional area $A_{rmin}$ ranges from about $0.97 A_s$ to $(\sigma ts_{min}/\sigma ts_{max})A_s$, where, for the given grade and size of fastener, $\sigma ts_{min}$ is the specified minimum allowable tensile strength (stress) and $\sigma ts_{max}$ is the tensile strength (stress) corresponding to the specified maximum allowable core hardness, and the axial length $L_r$ ranges from about $\sqrt{A_{rmin}}$ to the maximum length that can be accommodated within the shank component; and
   (c) means with the reduced portion, extending axially along substantially the axial length $L_r$ of the reduced portion and the axial lengths of the first and second transition portions, to align the reduced portion of the metal fastener in a passageway in which the metal fastener is to be used.

12. The metal fastener of claim 11 wherein the fastener includes marking means to indicate the amount of plastic twist deformation of the reduced portion on rotation tightening of the fastener.

13. The metal fastener of claim 11 wherein the axially transverse cross-sectional area $A_r$ is noncircular in shape over substantially the axial length $L_r$ and the means to align the fastener includes a plurality of metal, generally parallel, raised, rib means extending generally axially and extending outwardly to the shank diameter $D_s$ of the fastener.

14. The metal fastener of claim 11 wherein the axially transverse cross-sectional area $A_r$ is circular in shape and the means to align the fastener includes a solid material peripherally positioned around the reduced portion and the first and second transition portions and forming a generally cylindrical shape which extends from the surface of the reduced portion and the transition portions outwardly to the shank diameter $D_s$ of the fastener.

15. The metal fastener of claim 11 wherein the tensile strength (stress) of the metal in the reduced portion is made of such value that if the metal fastener is tested to failure in a tensile test the fastener will fail in the reduced portion with a tensile strength (force) at least as large as the specified minimum tensile strength (force) for the grade, size, and threads of the fastener.

16. The metal fastener of claim 11 wherein the axially transverse cross-sectional area $A_r$ of the reduced portion is constant in size along the axial length $L_r$.

17. A metal fastener characterized by a sharp yield point and improved elongation beyond the yield point and a tensile strength (force) at least as large as the specified minimum for the grade, size, and threads of said metal fastener, which metal fastener is a bolt of nominal diameter D and is heat treated after forming and comprises:
   (a) a head component for the application of torque to the fastener;
   (b) an externally threaded component having threads of nominal diameter D with a stress area $A_s$;
   (c) a nonthreaded shank component having a diameter $D_s$ equal to or substantially equal to the nominal diameter D axially extending between the head and threaded components and integrally therewith, the shank component characterized by a reduced portion of axial length $L_r$ with a first transition portion at one end and a second transition portion at the other end of the reduced portion, and wherein within the reduced portion the maximum axially transverse cross-sectional area $A_{rmax}$ is not larger than the stress area $A_s$ of the threaded component and the minimum cross-sectional area $A_{rmin}$ ranges from about $0.97 A_s$ to $(\sigma ts_{min}/\sigma ts_{max})A_s$, where, for the given grade and size of fastener, $\sigma ts_{min}$ is the specified minimum allowable tensile strength (stress) and $\sigma ts_{max}$ is the tensile strength (stress) corresponding to the specified maximum allowable core hardness, and the axial length $L_r$ ranges from about $\sqrt{A_{rmin}}$ to the maximum length that can be accommodated within the shank component and wherein the axially transverse cross-sectional area $A_r$ is circular in shape; and
   (d) means with the reduced portion, extending axially along substantially the axial length $L_r$ of the reduced portion and the axial lengths of the first and second transition portions, to align the reduced portion of the metal fastener in a passageway in which the metal fastener is to be used and said means to align the fastener includes a solid material peripherally positioned around the reduced portion and the first and second transition portions and forming a generally cylindrical shape which extends from the surface of the reduced portion and the transition portions outwardly to the shank diameter $D_s$ of the fastener.

18. The metal fastener of claim 17 wherein the tensile strength (stress) of the metal in the reduced portion is made of such value that if the metal fastener is tested to failure in a tensile test the fastener will fail in the reduced portion with a tensile strength (force) at least as large as the specified minimum tensile strength (force) for the grade, size, and threads of the fastener.

19. The metal fastener of claim 17 wherein the fastener includes marking means to indicate the amount of plastic twist deformation of the reduced portion on rotation tightening of the fastener.

* * * * *